(12) United States Patent
Huang et al.

(10) Patent No.: US 12,379,773 B1
(45) Date of Patent: Aug. 5, 2025

(54) PERIPHERAL DEVICE FOR OPERATING A TARGET DEVICE

(71) Applicant: Zepp, Inc., Cupertino, CA (US)

(72) Inventors: Wang Huang, Anhui FTZ (CN); Kongqiao Wang, Cupertino, CA (US)

(73) Assignee: Zepp, Inc., Milpitas, CA (US)

( * ) Notice: Subject to any disclaimer, the term of this patent is extended or adjusted under 35 U.S.C. 154(b) by 0 days.

(21) Appl. No.: 18/884,695

(22) Filed: Sep. 13, 2024

(51) Int. Cl.
| | |
|---|---|
| G06F 3/01 | (2006.01) |
| G06F 3/16 | (2006.01) |
| H04N 23/695 | (2023.01) |
| G06F 3/0482 | (2013.01) |
| G06F 3/04842 | (2022.01) |

(52) U.S. Cl.
CPC .............. *G06F 3/011* (2013.01); *G06F 3/167* (2013.01); *H04N 23/695* (2023.01); *G06F 3/0482* (2013.01); *G06F 3/04842* (2013.01)

(58) Field of Classification Search
CPC ........ G06F 3/011; G06F 3/167; G06F 3/0482; G06F 3/04842; H04N 23/695
USPC ........................................................ 345/156
See application file for complete search history.

(56) References Cited

U.S. PATENT DOCUMENTS

| | | | | |
|---|---|---|---|---|
| 9,489,671 | B2 * | 11/2016 | Zhou | G06F 3/041 |
| 10,684,738 | B1 * | 6/2020 | Sicora | G06F 3/0485 |
| 11,461,278 | B2 * | 10/2022 | Nelbach, Jr. | G06F 16/176 |
| 2007/0109417 | A1 * | 5/2007 | Hyttfors | H04N 23/63 |
| | | | | 348/E5.042 |
| 2010/0121890 | A1 * | 5/2010 | Perkins | G06F 16/9024 |
| | | | | 707/805 |
| 2016/0313895 | A1 * | 10/2016 | Ramesh | G06F 9/44505 |
| 2016/0378743 | A1 * | 12/2016 | Kumar | G06F 3/04883 |
| | | | | 715/780 |
| 2020/0302313 | A1 | 9/2020 | Jeong | |
| 2021/0056750 | A1 * | 2/2021 | Rowley | G06F 3/016 |
| 2022/0091905 | A1 * | 3/2022 | Lee | G06F 9/5088 |
| 2023/0031702 | A1 * | 2/2023 | Li | G06V 10/82 |
| 2023/0367459 | A1 * | 11/2023 | Huh | H04N 21/478 |
| 2024/0281111 | A1 * | 8/2024 | Chao | G06F 9/452 |

FOREIGN PATENT DOCUMENTS

| | | |
|---|---|---|
| CN | 104951077 A | 9/2015 |
| CN | 109474658 B | 4/2023 |

* cited by examiner

*Primary Examiner* — Tom V Sheng
(74) *Attorney, Agent, or Firm* — Young Basile Hanlon & MacFarlane, P.C.

(57) ABSTRACT

Provided is a method of using at least one peripheral device including an image sensor and at least one processor for operating a target device, including receiving a first input from a user associated with the target device indicative of a task to be performed by the target device; determining a first instruction for the target device to perform based on the first input; determining whether the first instruction includes displaying content associated with the task on the target device; in response to determining that the first instruction includes displaying content associated with the task on the target device, obtaining displayed content associated with the task on the target device; and determining a second instruction for the target device to perform based on a second input received from the user indicative of a reaction to the displayed content associated with the task on the target device.

20 Claims, 4 Drawing Sheets

PERIPHERAL DEVICE FOR OPERATING A TARGET DEVICE

TECHNICAL FIELD

This application relates to a peripheral device for operating a target device, and in particular, using a peripheral device with an image sensor for operating a target device.

BACKGROUND

Modern technologies have introduced peripheral devices equipped with camera functionalities that can connect to and control primary devices like computers or TVs. The advancement of machine learning innovations, such as large language models (LLMs), has the potential to significantly expand the capabilities and applications of these peripheral devices.

SUMMARY

Disclosed herein are implementations of methods, apparatuses, and systems of using a peripheral device for operating a target device.

In one aspect, a method of using at least one peripheral device for operating a target device, the at least one peripheral device comprises an image sensor and at least one processor, is disclosed. The method includes: receiving, by the at least one peripheral device, a first input from a user associated with the target device, the first input indicative of a task to be performed by the target device; determining, by the at least one processor, a first instruction for the target device to perform based on the first input; determining, by the at least one processor, whether the first instruction includes displaying content associated with the task on the target device; in response to determining that the first instruction includes displaying content associated with the task on the target device, obtaining, by the image sensor, displayed content associated with the task on the target device comprising a screenshot of a display screen of the target device; and determining, by the at least one processor, a second instruction for the target device to perform based on a second input received by the at least one peripheral device from the user associated with the target device, the second input indicative of a reaction to the displayed content associated with the task on the target device.

In another aspect, a peripheral device for operating a target device is disclosed. The peripheral device includes an image sensor, a non-transitory memory; and at least one processor configured to execute instructions stored in the non-transitory memory to: receive a first input from a user associated with the target device, the first input indicative of a task to be performed by the target device; determine a first instruction for the target device to perform based on the first input; determine whether the first instruction includes displaying content associated with the task on the target device; in response to determining that the first instruction includes displaying content associated with the task on the target device, instruct the image sensor to obtain displayed content associated with the task on the target device comprising a screenshot of a display screen of the target device; and determine second instruction for the target device to perform based on a second input received by the peripheral device from the user associated with the target device, the second input indicative of a reaction to the displayed content associated with the task on the target device.

In another aspect, a non-transitory computer-readable storage medium configured to store computer programs for using at least one peripheral device for operating a target device is disclosed. The computer programs include instructions executable by at least one processor to perform the method described above.

DETAILED DESCRIPTION

A peripheral device is an external or auxiliary device that connects to a computer or other primary device (referred to herein as a target device) to expand its functionality. For example, a peripheral device can be an I/O device that is connected to the target device by wired or wireless connections. The development of peripheral devices with camera functionalities has gained increasing popularity. These devices, ranging from wireless cameras and smart glasses to drones and smartwatches, are reshaping how we capture and interact with the world around us. Along with this, machine learning technologies, including large language models (LLMs), have enabled the boundaries and capabilities of these peripheral devices to greatly expand. From the perspective of product experiences, with the addition of machine learning models such as the LLMs, peripheral devices and systems can evolve from simple tools that take commands or perform specific tasks, to become dynamic "living beings" capable of automatically understanding semantics, generate tasks and interacting with user to control target devices such as TVs, computers, and more.

Implementations of this disclosure aim to develop a collaboration system to control a target device with at least one peripheral device having one or more sensors such as an image sensor, which can use machine learning models such as the LLMs to generate instructions for the target device from user commands, obtain and analyze the displayed content on the target device through the image sensor to elicit further commands from the user, and subsequently generate additional instructions for the target device, among other things.

According to implementations of this disclosure, a method using at least one peripheral device for operating a target device is provided. The at least one peripheral device can include, for example, at least one processor and an image sensor, such as a camera. In some implementations, the at least one peripheral device can also include other sensors such as an audio sensor, which can include a microphone. The at least one peripheral device can also include a speaker, which can be integrated with or separate from the audio sensor. The image sensor and the other sensors can be located in the same device or different devices. The at least one peripheral device can be used as an input and control device for the target device. The audio sensor, such as the microphone, can be used to receive input commands, such as verbal commands, from the user. The image sensor, such as the camera, can be used to obtain images or videos as desired, such as screenshots of at least a part of the displayed content on the target device.

According to implementations of this disclosure, a first input from a user associated with the target device is received by the at least one peripheral device, which can be one or more of a textual, audio (e.g., verbal) or visual (e.g., image or video) input. The first input is indicative of a task to be performed by the target device. A first instruction for the target device to perform is determined by the at least one peripheral device based on the first input, along with whether the first instruction includes (e.g., requires) displaying content associated with the task on the target device. In response to determining that the first instruction includes displaying content associated with the task on the target device, displayed content on the target device, which is associated with the task, can be obtained by the image sensor of the at least one peripheral device. This can include a screenshot of the display screen of the target device. A second instruction for the target device to perform can be determined based on a second input received by the at least one peripheral device from the user associated with the target device. The second input is indicative of a reaction by the user to the displayed content associated with the task on the target device. In some implementations, the displayed content obtained by the image sensor (e.g., the screenshot) can be analyzed to help generate responses such as questions to elicit the reaction by the user to the displayed content. In some implementations, the second instruction for the target device to perform can be determined based on the second input and the displayed content obtained by the image sensor. According to some implementations of this disclosure, the at least one peripheral device can be connected (e.g., wirelessly) to the target device without making any configuration change on the target device (such as configuration updates, software installation and/or updates), and the user can control the target device using the at least one peripheral device instead of having to operate the target device directly (e.g., by mouse or keyboard inputs), thus making it easier or more efficient for the user to operate the target device.

In some implementations, contents from different modalities (audio and visual) can be analyzed and interpreted through a machine learning model, such as a large language model (LLM), to determine tasks and instructions associated with these contents. Some or all of the first instruction, the second instruction or the responses to elicit user reactions, can be generated using the machine learning model, which can include, for example, a deep learning model, or a generative AI model such as an LLM. The machine learning model can be adapted to run on the at least one processor or the server, and can include at least one of a first large language model (LLM) adapted to run on the at least one peripheral device, or a second LLM adapted to run on the server. The first or second LLM can be customized for the user. In some implementations, the second LLM adapted to run on the server is included, while the first LLM adapted to run on the at least one peripheral device is optional; when the first LLM is included, it should be designed to be compact in memory size requirement to be able to run on the at least one peripheral device.

Further details of using a peripheral device for operating the target device are described herein with initial reference to an example device in which it can be implemented.

Figure 1:
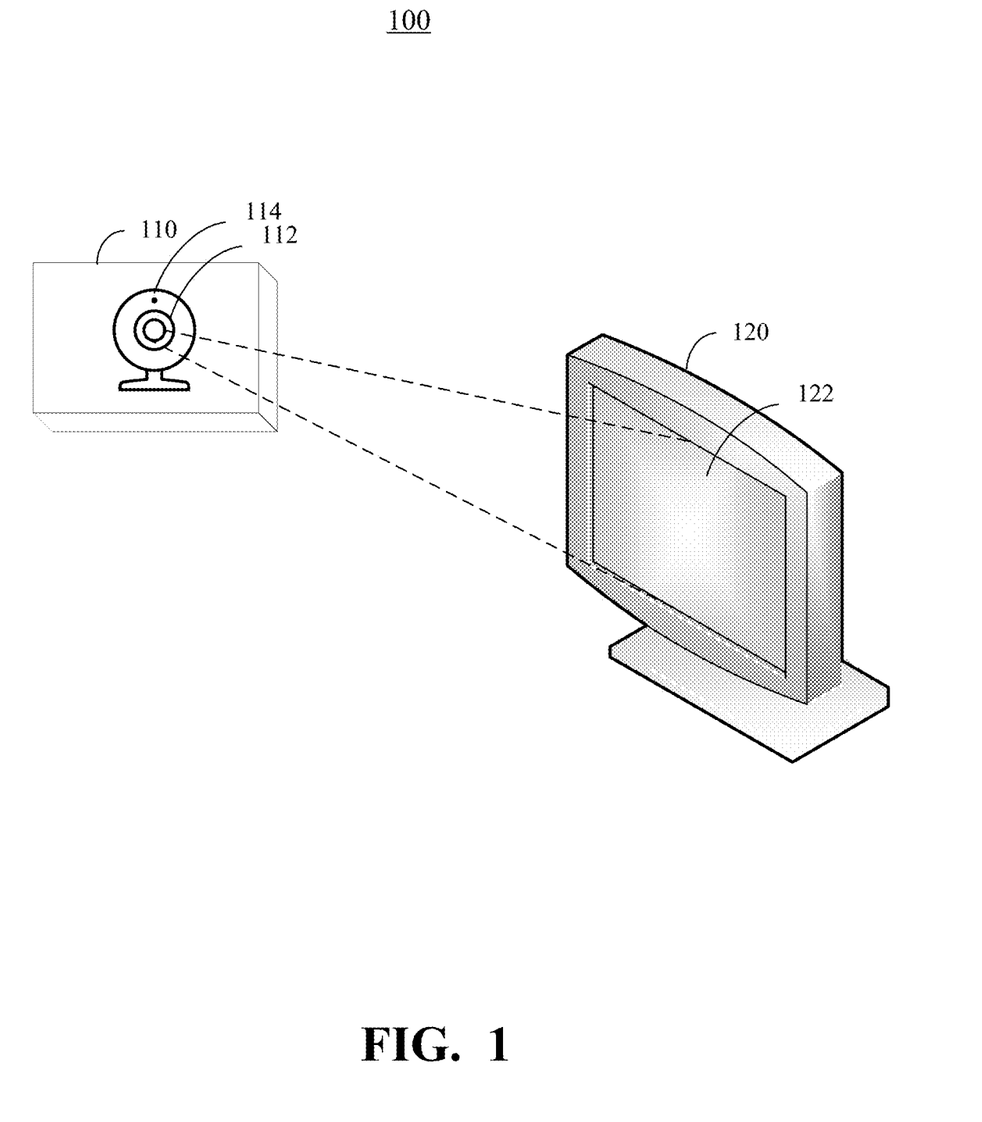
FIG. 1 is a diagram of an example system of a target device and a peripheral device for operating the target device in accordance with the present teachings.

FIG. 1 depicts a diagram of an example system of a target device and a peripheral device for operating the target device in accordance with the present teachings. According to some implementations of this disclosure, as shown in FIG. 1, a system 100 includes a target device 120 and at least one peripheral device such as a device 110 for operating the target device 120. The device 110 may be in communication with the target device 120, and can be used to operate the target device 120.

In some implementations, the device 110 can be implemented by a computing device 200 in FIG. 2, which will be described in further details below connection with FIG. 2. In some implementations, the device 110 can be a separate device, as shown in the example, or integrated (or partially integrated) with the target device 120 (not shown).

The device 110 may include sensors and processing tools for detecting, collecting, processing one or more of a text, audio (e.g., voice) or visual (e.g., image or video) input from a user. As shown in FIG. 1, the device 110 includes one or more sensors, such as an image sensor 112, shown as a camera in this example. The device 110 can also (optionally) include an audio sensor 114, which can include a speaker, a microphone or both. The device 110 can also include other sensors such as one or more motion sensors, one or more physiological sensors, one or more acoustic sensors, etc. These sensors are only illustrative of the possibilities, however, and additional or alternative sensors may be included. Though not depicted in the diagram shown in FIG. 1, the device 110 may also include one or more such sensors and components inside the surface. It should be understood that the device 110 can be implemented with a different configuration of the sensors from what is depicted in FIG. 1 or the examples of this disclosure.

Although not shown, the device 110 may further include one or more communication modules. The one or more communication modules may also communicate with other devices such as a personal device of the user (such as a watch, a handheld device, a smart phone, a tablet, a laptop computer, a desktop computer, or the like) or a server (such as a cloud-based server). The communications can be transmitted wirelessly (e.g., via Bluetooth®, RF signal, Wi-Fi® signal, near field communications, etc.) or through one or more electrical connections embedded in the device 110. Any analog information collected or analyzed can be translated to digital information for reducing the size of information transfers between modules.

The device 110 may also include an input and/or an output unit, such as a (optional) display unit (not shown), sound unit (shown as the audio sensor 114), tactile unit or the like, for communicating information to the user of the device 110. The display unit may be configured to display the images or videos captured by the sensors such as the image sensor 112, notifications or alerts.

Figure 2:
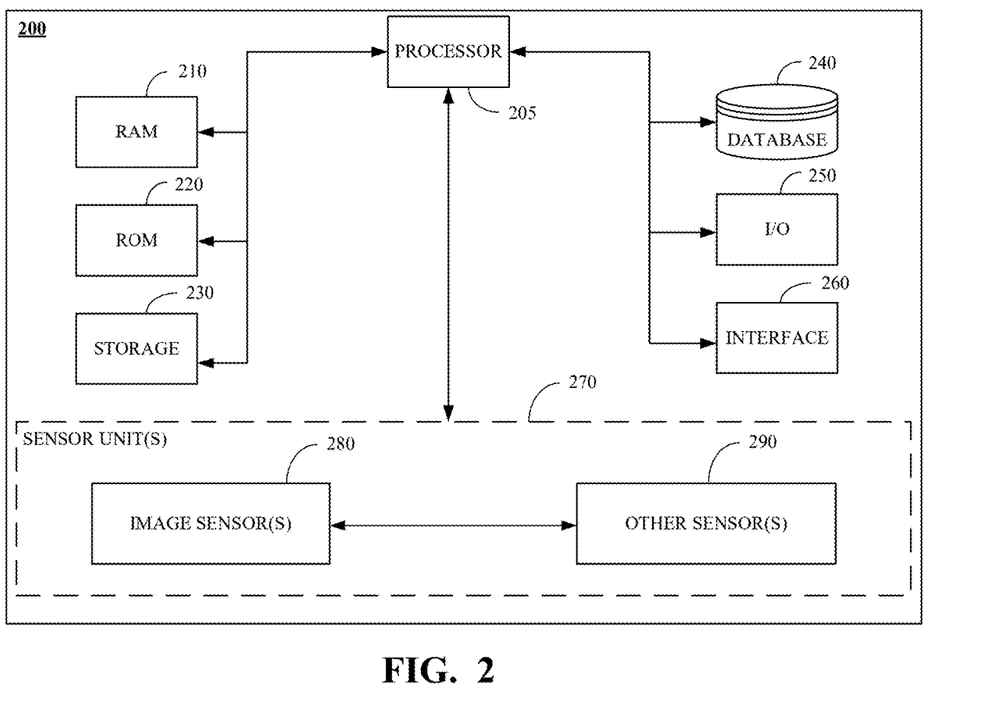
FIG. 2 is a block diagram of an example of a computing device that may be used with or incorporated into the peripheral device for operating the target device in accordance with the present teachings.

FIG. 2 depicts an example of a computing device 200 that may be used with or incorporated into a peripheral device such as the device 110. The computing device 200 is representative of the type of computing device that may be present in or used in conjunction with at least some aspects of the device 110, or any other device comprising electronic circuitry. For example, the computing device 200 may be used in conjunction with any one or more of transmitting signals to and from the image sensor 112 or the audio sensor 114, sensing or detecting signals received by one or more sensors of the device 110, processing received signals from one or more components or modules of the device 110 or a secondary device, and storing, transmitting, or displaying information. The computing device 200 may be or may be included within the device 110. The computing device 200 may be a mobile terminal or remote device that is in communication with the device 110. The computing device 200, the device 110, or both may be in communication with a server (e.g., a cloud-based server) or the target device, such as the target device 120. For example, the computing device 200 may be a separate device (e.g., a mobile terminal device) from the device 110, and both the computing device 200 and the device 110 may be in direct communication with the server or the target device. Alternatively, the computing device 200 may be in direct communication with the server and the device 110 may be in communication with the server via the computing device 200. The computing device 200 may be used with or incorporated into the target device 120. It should also be noted that the computing device 200 is illustrative only and does not exclude the possibility of another processor controller-based system being used in or with any of the aforementioned aspects of the device 110.

In one aspect, the computing device 200 may include one or more hardware and/or software components configured to execute software programs, such as software for obtaining, storing, processing, and analyzing signals, data, or both. For example, the computing device 200 may include one or more hardware components such as, for example, a processor 205, a random-access memory (RAM) 210, a read-only memory (ROM) 220, a storage 230, a database 240, one or more input/output (I/O) modules 250, an interface 260, and one or more sensors 270.

Alternatively, and/or additionally, the computing device 200 may include one or more software components such as, for example, a computer-readable medium including computer-executable instructions for performing techniques or implement functions of tools consistent with certain disclosed embodiments or implementations. It is contemplated that one or more of the hardware components listed above may be implemented using software. For example, the storage 230 may include a software partition associated with one or more other hardware components of the computing device 200. The computing device 200 may include additional, fewer, and/or different components than those listed above. It is understood that the components listed above are illustrative only and not intended to be limiting or exclude suitable alternatives or additional components.

The processor 205 may include one or more processors, each configured to execute instructions and process data to perform one or more functions associated with the computing device 200. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 2, the processor 205 may be communicatively coupled to the RAM 210, the ROM 220, the storage 230, the database 240, the I/O module 250, the interface 260, and the one or more sensors 270. The processor 205 may be configured to execute sequences of computer program instructions to perform various processes, which will be described in detail below. The computer program instructions may be loaded into the RAM 210 for execution by the processor 205.

The RAM 210 and the ROM 220 may each include one or more devices for storing information associated with an operation of the computing device 200 and/or the processor 205. For example, the ROM 220, may include a memory device configured to access and store information associated with the computing device 200, including information for identifying, initializing, and monitoring the operation of one or more components and subsystems of the computing device 200. The RAM 210 may include a memory device for storing data associated with one or more operations of the processor 205. For example, the ROM 220 may load instructions into the RAM 210 for execution by the processor 205.

The storage 230 may include any type of storage device configured to store information that the processor 205 may use to perform processes consistent with the disclosed embodiments.

The database 240 may include one or more software and/or hardware components that cooperate to store, organize, filter, and/or arrange data used by the computing device 200 and/or the processor 205. For example, the database 240 may include user profile information, historical activity and user-specific information, physiological parameter information, predetermined menu/display options, and other user preferences. Alternatively, the database 240 may store additional and/or different information. For example, the database 240 may include information to establish a machine learning model such as a large language model (LLM) that can receive inputs from the I/O module 250 and/or sensor(s) 270. The machine learning model can be customized for the user. In some implementations, a first LLM can be established locally at the computing device 200 as an alternative to a second LLM on a server, such as a cloud server. The first LLM can be established as a relatively lightweight LLM compared to the second LLM on the server. For example, the first LLM can be activated when the connection to the server is limited or fails. The machine learning model can be used, for example, to analyze inputs (e.g., text, audio, image or video) received by the computing device 200, generate instructions for the target device 120 to perform based on the inputs, analyze displayed content on the target device 120, and generate responses such as questions to elicit further user reactions, etc., which will be described in further details below in connection with FIGS. 3 and 4.

The I/O module 250 may include one or more components configured to communicate information with a user associated with the computing device 200. For example, the I/O module 250 may include one or more buttons, switches, or touchscreens to allow a user to input parameters associated with the computing device 200. The I/O module 250 may also optionally include a display including a graphical user interface (GUI) and/or one or more light sources for outputting information to the user. The I/O module 250 may also include one or more communication channels for connecting the computing device 200 to one or more secondary or peripheral devices such as, for example, a desktop computer, a laptop, a tablet, a smart phone, a flash drive, or a printer, to allow a user to input data to or output data from the computing device 200. The I/O module 250 can also include one or more sensors 270, which can be used for receiving inputs (such as audio or visual inputs) and outputting information (such as audio or visual outputs).

The interface 260 may include one or more components configured to transmit and receive data via a communication network, such as the internet, a local area network, a workstation peer-to-peer network, a direct link network, a wireless network, or any other suitable communication channel. For example, the interface 260 may include one or more modulators, demodulators, multiplexers, demultiplexers, network communication devices, wireless devices, antennas, modems, and any other type of device configured to enable data communication via a communication network. The communications can be transmitted wirelessly (e.g., via Bluetooth, RF signal, Wi-Fi signal, near field communications, etc.) or through one or more electrical connections embedded in the computing device 200. Any analog information collected or analyzed can be translated to digital information for reducing the size of information transfers between modules.

The computing device 200 may further include the one or more sensors 270. The one or more sensors 270 can be part of the I/O module 250, or communicate with the I/O module 250 to input or output information. In some implementations, the one or more sensors 270 may include one or more of an image sensor 280, and/or other sensors 290, such as an audio sensor, an optical sensor, an ambient light sensor, a pressure sensor, a contact sensor, an acoustical sensor, etc. For example, the image sensor 280 can be used for receiving image or video input. The audio sensor can be used for receiving audio (such as verbal) input. The audio sensor can also be used for outputting audio signals such as synthetic voice generated by the processor 205. It should be noted that these sensors are only illustrative of a few possibilities and the one or more sensors 270 may include alternative or additional sensors suitable for use in the device 200. It should also be noted that although one or more sensors are described collectively as the one or more sensors 270, any one or more sensors or sensor units within the device 200 may operate independently of any one or more other sensors. Moreover, in addition to collecting, transmitting, and receiving signals or information to and from the one or more sensors 270 at the processor 205, any of the one or more sensor units of the one or more sensors 270 may be configured to collect, transmit, or receive signals or information to and from other components or modules of the computing device 200, including but not limited to the database 240, the I/O module 250, or the interface 260.

Figure 3:
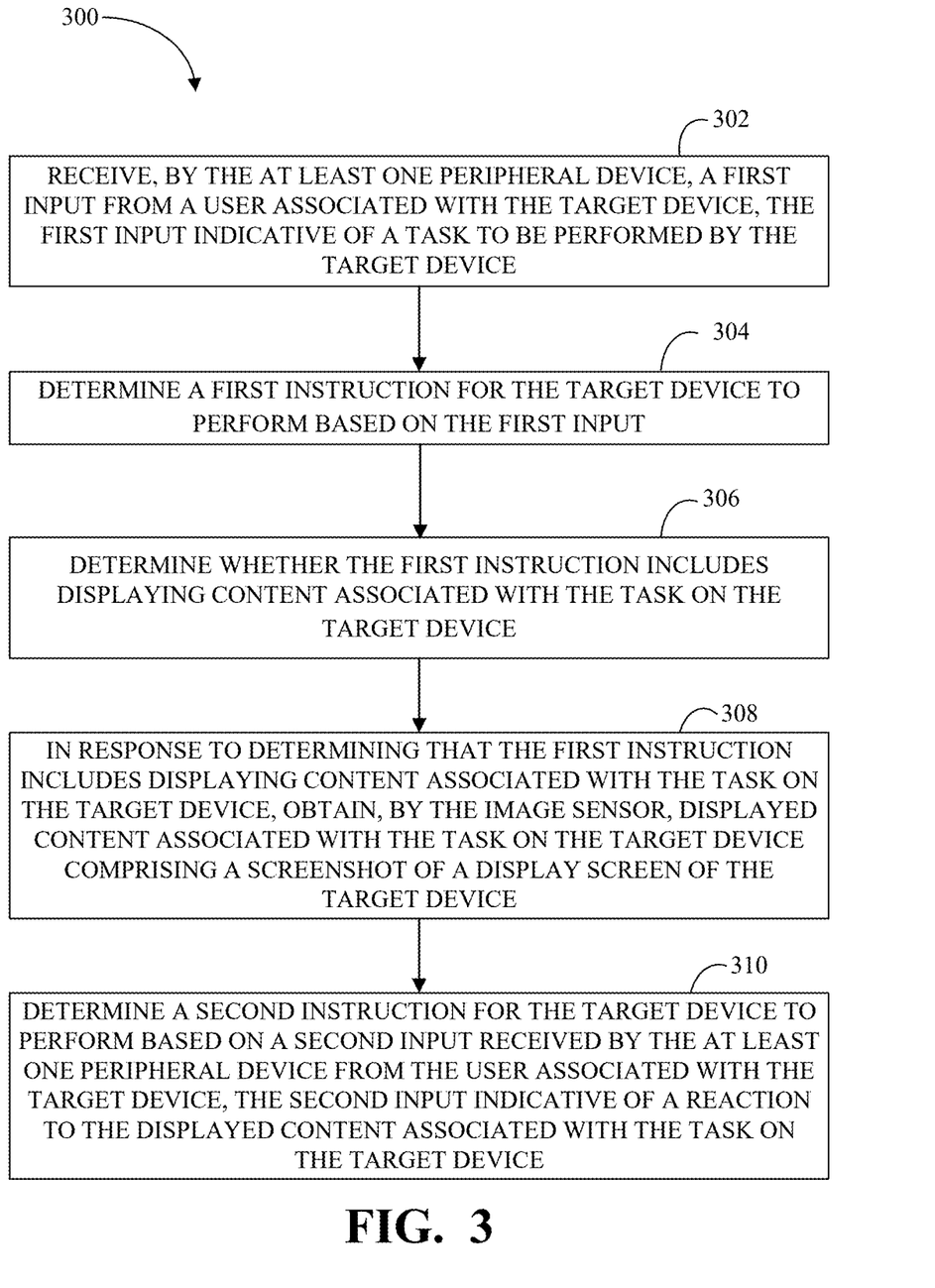
FIG. 3 is a flow diagram of an example process of using a peripheral device for operating a target device according to some implementations of this disclosure.

FIG. 3 is a flowchart of an example process 300 of using at least one peripheral device for operating a target device according to some implementations of this disclosure. It should be noted that the flowchart and the process 300 may be used interchangeably herein. The process 300 can be implemented as software and/or hardware modules in, for example, the device 110 of FIG. 1 or the computing device 200 of FIG. 2. In an example, the process 300 can be implemented as software modules stored in the storage 230 as instructions and/or data executable by the processor 205 of an apparatus, such as the computing device 200 in FIG. 2. Some or all of the operations of the process 300 can be implemented by the processor 205 of FIG. 2. In another example, the process 300 can be implemented in hardware as a specialized chip storing instructions executable by the specialized chip. In some implementations, the process 300 can be implemented using more than one peripheral device, such as the device 110 or the computing device 200 (which can be used to implement a portion of the process 300) and another peripheral device (which can be used to implement the remaining portion of the process 300). The target device can be any device that has a display screen and capable of receiving instructions from the at least one peripheral device, such as the device 110 or the computing device 200 that is incorporated into the device 110, to perform tasks. For example, the target device can be a TV, a computer, a mobile phone or another personal device, etc. The at least one peripheral device can be, for example, a fixed or movable device in the vicinity of the target device, such as the target device 120. The at least one peripheral device can be a separate device or integrated with the target device.

A person skilled in the art will note that all or a portion of the aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

Similarly, all or a portion of the aspects of the disclosure described herein can be implemented by the device 110 (e.g., by the processor 205 when the computing device 200 is incorporated into the device 110), by a server in communication with the device 110 and/or the computing device 200, or both. Additionally, all or a portion of the aspects of the disclosure described herein (e.g., steps, procedures, processes, etc.) may be performed by the device 110, or the computing device 200, or a secondary companion device (e.g., a mobile terminal, a client device, other remote device, another wearable device etc.). For example, a portion of the steps or procedures described herein may be performed by the aforementioned server while another portion of the steps or procedures may be performed by the secondary companion device.

The at least one peripheral device that implements the process 300 includes an image sensor and at least one processor. In some implementations, the image sensor can include a camera with an adjustable viewing angle. The image sensor can be used, for example, to capture a display screen of the target device. The adjustable viewing angle allows the image sensor to be adjusted (e.g., rotated or moved) to face the display screen of the target device for screen capturing. The at least one peripheral device and the target device can communicate with each other directly (e.g., via hardwire, Bluetooth, RF, Wi-Fi signal, near field communications, etc.) or indirectly (e.g., via another device).

In some implementations, the at least one peripheral device can also include an audio sensor that can be used for user interactions. In some implementations, the at least one peripheral device comprises the image sensor and the audio sensor, both of which can be used for interacting with the user to operate the target device.

At an operation 302, a first input from a user associated with the target device is received by the at least one peripheral device. The first input received by the at least one peripheral device can be one or more of a textual, audio (e.g., verbal) or visual (e.g., image or video) input from the user. The first input is indicative of a task to be performed by the target device. The task can be any act(s) that can be performed by the target device, such as to play a movie title, open a browser, send a document etc.

The first input can be received by the image sensor and/or another sensor, such as the audio sensor. The first input can also be received by other means such as an I/O module (e.g., the I/O module 250) or an interface (e.g., the interface 260). In some implementations, such as when the at least one peripheral device is connected to a communication network (e.g., the Internet), at least a part of the first input can be received from the communication network.

In an example, the first input can be a verbal request from the user to play a certain movie title ("please play Wild West"), which can be indicative of a task to be performed by the target device, such as to find and stream an audiovisual media titled Wild West on the target device. The first input can also be a user typing a command on the at least one peripheral device, the target device or a personal device of the user. The first input can also include multiple forms of input (such as a combination of text and audio inputs).

At an operation 304, a first instruction for the target device to perform is determined by the at least one processor of the at least one peripheral device based on the first input.

In some implementations, the first instruction can include one or more instructions for the target device to perform based on the first input. The one or more instructions can be derived from and associated with the task indicated by the first input. The first instruction can include, for example, a computer executable instruction (or instructions) associated with the task. The first instruction can be determined by the at least one processor by analyzing the first input and decomposing the task indicated by the first input. For example, if the first input is a request from the user to play a certain movie title, the first instruction can be determined by the at least one processor by analyzing the first input and decomposing the task of finding and streaming the requested movie title on the target device. The first instruction can include, for example, one or more of opening a media player, locating the requested movie title, and streaming the requested movie title on the target device, etc. For another example, the first instruction can include moving the cursor to a browser icon of the display screen of the target device and opening a browser, or instruction(s) of inputting user-generated contents such as "smart watches" in a search box of the browser, etc.

In some implementations, the first instruction for the target device to perform based on the first input is determined by the at least one processor using a machine learning model adapted to run on the at least one processor or a server. The machine learning model can include, for example, a deep learning model, or a generative AI model such as a large language model (LLM). The machine learning model adapted to run on the at least one processor or the server can include at least one of a first large language model (LLM) adapted to run on the at least one peripheral device, or a second LLM adapted to run on the server. The first or second LLM can be customized for the user. The first instruction can be determined by analyzing the first input and decomposing the task indicated by the first input into the first instruction using the machine learning model.

In some implementations, in addition to the machine learning model, an expert knowledge base, which interacts with the machine learning model, can also be used. The expert knowledge base can be used, for example, to provide reliable prompts to the machine learning model, such as to reduce hallucinations of the LLM(s). The expert knowledge base can also be used to perform more complex semantic parsing or task generation. The interactions between the expert knowledge base and the machine learning model can include, for example, communications in either direction or bilateral, which can include collaborations. The expert knowledge base can be at a remote location such as a server, for example. The expert knowledge base can be, for example, a domain knowledge database.

In some implementations, after determining the first instruction at the operation 304, the peripheral device sends the first instruction to the target device for the target device to perform.

As an illustrative use case example, the process 300 can be implemented in a living room scenario. A user named Alex walks in and requests to watch a movie named "Wild West" ("please play Wild West"). The living room has a peripheral device that implements the process 300 and a TV as the target device. The peripheral device is connected to the TV through a wireless interface. The peripheral device includes an image sensor and an audio sensor. Also, the peripheral device has an adjustable viewing angle that can be turned to face the TV.

The peripheral device receives inputs from a user such as Alex from the image sensor, audio sensor, the I/O module, or the interface (e.g., the communication network such as the Internet), or a combination of the above. The peripheral device has at least one processor that can analyze the inputs received from the user. For example, the peripheral device can analyze and interpret the semantics of verbal inputs received from the audio sensor and generate instructions for the TV to perform. In addition, the peripheral device can use the image sensor to "see" what is displayed on the TV while the TV is performing the instructions, and to "understand" the displayed content, such as images, video or text, etc., by using a machine learning model adapted to run on the at least one processor of the peripheral device or the server. The machine learning model can be an LLM that has been discussed above.

In this example, Alex turns to the peripheral device and says "please play Wild West." Here, the peripheral device receives a first input, a request by Alex to play a title named "Wild West" from the audio sensor. The first input is indicative of a task, such as to find, confirm, and play the title named "West World" on the target device. The machine learning model adapted to run on the peripheral device, such as the first LLM, can be customized for a user like Alex, and can be used to determine the first instruction for the TV to perform by analyzing the first input, and decompose the task indicated by the first input. The task can be decomposed into instructions such as, for example, instructions for opening a media player, searching and locating all titles with "Wild West", confirming with Alex which title he would like to play, playing the confirmed title etc. The first instruction will be sent by the peripheral device to the TV and can include one or more of these instructions for the TV to perform.

In another example, the first input can be a user typing "opening a browser", and the task to be performed by the target device can be opening a browser on the target device and asking the user what to do next. The first instruction determined for the target device to perform can be determined based on the first input as, for example, instructions for "move the cursor to coordinates associated with the icon of the browser," and "click on the icon," etc.

At an operation 306, whether the first instruction includes displaying content associated with the task on the target device is determined by the at least one processor of the at least one peripheral device.

In some implementations, at the operation 306, the at least one processor can determine whether displaying content associated with the task on the target device is required by the task, and in response to determining that displaying content associated with the task on the target device is required by the task, the at least one processor can proceed to detect the displayed content that relates to the first instruction on the display screen of the target device.

In some implementations, at the operation 306, the at least one processor can determine whether the display screen of the target device has been turned on; and in response to determining that the display screen of the target device has been turned on, the display screen of the target device can be monitored for detecting the displayed content on the display screen of the target device that relates to the first instruction.

Back to the living room movie playing example, as described above, the first instruction can include, for example, one or more of opening a media player on the TV, searching and locating all titles with "Wild West", confirming with Alex which title he would like to play, playing the confirmed title, etc. It can be determined from the first instruction that the first instruction includes displaying content associated with the task on the TV. For example, opening a media player on the TV may require the display screen of the TV to display the media player, searching and locating all titles with "Wild West" may require the display screen of the TV to display all the related titles located by a search for "Wild West" on the TV, etc. In some implementation, once it is determined that displaying content associated with the task on the TV is required by the task, the at least one processor of the peripheral device can proceed to detect displayed content that relates to the first instruction (e.g., opening a media player and/or searching and locating all titles with "Wild West") on the display screen of the TV. In some implementations, detecting displayed content that relates to the first instruction can include determining whether the display screen of the TV has been turned on, and if the display screen is on, monitoring the display screen of the TV for detecting the displayed content that relates to the first instruction. For example, the displayed screen of the TV can be monitored for detecting a change (in contents) on the displayed screen of the TV after the first instruction is sent to the TV.

At an operation 308, in response to determining that the first instruction includes displaying content associated with the task on the target device at the operation 306, displayed content associated with the task on the target device can be obtained by the image sensor of the at least one peripheral device, which can include a screenshot of the display screen of the target device. The screenshot of the display screen of the target device can include one or more images, one or more video clips, or a combination thereof. The screenshot of the display screen of the target device can include, for example, a screenshot of at least a part of the displayed content on the display screen of the target device, a partial or full screenshot of at least a part of the displayed content on the display screen of the target device, or the display screen can be one of multiple display screens of the target device, etc.

However, if the evaluation at the operation 306 determines that the first instruction does not include displaying content associated with the task on the target device, the process 300 can return to the operation 302 to obtain the next input from the user. In some implementations, the next input from the user can include a third input received by the at least one peripheral device from the user associated with the target device. The third input can be indicative of a reaction by the user to the first instruction performed by the target device, which can be used to determine the next instruction for the target device to perform if appropriate. For example, the third input can be a verbal request from the user to select a music piece for playing after the target device starts to play excerpts of a certain genre of music requested by the user.

In some implementations, the image sensor can include a camera with an adjustable viewing angle. Prior to obtaining, by the image sensor, the displayed content associated with the task on the target device at the operation 308, in response to determining that the first instruction includes displaying content associated with the task on the target device, a third instruction to turn on the image sensor to face the display screen of the target device can be determined by the at least one processor. For example, the image sensor of the peripheral device may not be directly facing the display screen of the target device when the first input is received, and the third instruction can be determined to turn the image sensor to face the display screen of the target device, such as the screenshot taken by the image sensor will have the best view of the display screen of the target device. This will allow more accurate extraction and analysis of the displayed content associated with the task.

In some implementations, at the operation 308, after it is determined that displaying content associated with the task on the target device is required by the task, and in response to detecting the displayed content on the display screen of the target device that relates to the first instruction, the screenshot of the display screen of the target device, which relates to the first instruction and is associated with the task, is obtained by the image sensor.

In some implementations, in response to obtaining the displayed content associated with the task on the target device at the operation 308 and determining that the user associated with the target device is out of range, the displayed content comprising the screenshot of the display screen of the target device is sent by the at least one peripheral device to the user associated with the target device. For example, the user may be out of sight of the display screen of the target device and thus unable to view the displayed contents associated with the task on the target device. In the living room movie playing example, the user Alex could be in another room or out of the home when the displayed contents associated with the movie title on the TV is obtained by the image sensor. In that case, the screenshot of the displayed contents associated with the movie title can be sent to Alex so he can view it. For example, the screenshot of the displayed contents associated with the movie title can be sent and viewed on a personal device such as a wearable device or mobile phone.

In some implementations, the displayed content comprising the screenshot of the display screen of the target device can be selectively sent to the user when the user is out of range, depending on whether confirmation or further input from the user is needed for the next step of the task. In cases where confirmation or further input from the user is needed, it may be necessary for the user to view the displayed content, either directly from the display screen of the target device when the user is in range, or by viewing the screenshot of the display screen of the target device when the user is out of range, which can be sent to the user. In cases where confirmation or further instruction from the user is not needed for the next step, the displayed content comprising the screenshot of the display screen of the target device does not need to be sent to the user. For example, the user can request a note summarizing top ten social media posts about a specific watch model by email, which can be performed by the at least one peripheral device without requiring the user to confirm or provide further instruction for the next step, so the displayed content does not need to be sent to the user. The at least one peripheral device can gather the information needed for the task (such as social media posts from the apps or the browser), which can be summarized by the machine learning model such as the first LLM or the second LLM to generate the note that is sent to the user by email.

In some implementations, a response associated with the task can be generated by the at least one processor, based on the displayed content associated with the task on the target device obtained by the image sensor at the operation 308, to elicit from the user associated with the target device a reaction to the displayed content. The response can be generated by a machine learning model adapted to run on the at least one processor or a server. Here the term "response" is used in the perspective of the at least one peripheral device, since an output of the machine learning model such as an LLM is typically referred to as a "response", while an input to the machine learning model is typically referred to as a "prompt". However, from the perspective of the user, the "response" can become a prompt, such as a prompt question, to elicit further reaction from the user. For example, the response associated with the task, which can include questions for the user, can be generated by analyzing the displayed content (e.g., screenshot(s)) associated with the task on the target device obtained by the image sensor. The response generated by the at least one processor can be used as a prompt question for the user. For example, the response associated with the task can include questions such as "which one do you want to play?" or "is this what you are looking for?" The response is generated to elicit user reaction such as the user selecting one of the items from the displayed content on the target device, confirming whether the displayed content is what the user is looking for, etc.

In some implementations, the response associated with the task, or the first instruction for the target device to perform based on the first input determined at the operation 304, or a combination thereof, is determined by the at least one processor using the machine learning model adapted to run on the at least one processor or a server. The machine learning model adapted to run on the at least one processor or the server comprises at least one of the first LLM customized for the user and adapted to run on the at least one peripheral device, or the second LLM adapted to run on the server. For example, in cases such that the at least one peripheral device does not have a local machine learning model such as LLM, the machine learning model on the server can be used to generate the response. The first or the second LLM can be used to extract and "understand" the text from the screenshot of the displayed content on the target device, and to generate questions to elicit or prompt the user to have a reaction to the displayed content.

In some implementations, the machine learning model adapted to run on the at least one processor or the server comprises the first LLM and the second LLM. The at least one of the first instruction for the target device to perform based on the first input or the response associated with the task is determined by the at least one processor using the first LLM based on a determination that a connection between the server and the at least one peripheral device is not established; and the at least one of the first instruction for the target device to perform based on the first input or the response associated with the task is determined by the at least one processor using the second LLM based on a determination that a connection between the server and the at least one peripheral device is established. For example, when the second LLM on the server is not accessible or has very limited access by the at least one peripheral device, the response can be generated by the first LLM adapted to run on the at least one processor locally.

In some implementations, the response associated with the task is determined by the machine learning model and output by the at least one processor, to improve the interaction between the user and the at least one peripheral device to have a better control of the target device. For example, the response can be a question such as "now the icon is located, what to do next?" Besides taking inputs such as the first input from the user and determining the instructions, the machine learning model can be used to construct well-crafted responses as prompts for generating high quality user inputs. For example, a function library associated with operating mouse and keyboards can be established, which includes functions such as moving_cursor, mouse_action, keyboard_action etc. The instructions can be generated from the function library. During the interaction between the user and the at least one peripheral device, the at least one peripheral device can gradually create and update iterative history messages as background knowledge prompts for the machine learning model (e.g., building the memory capability of the LLM). The creation and iterative updating of history messages can be automated, which can be based on inputs such as system messages, user request, LLM responses, and function responses, etc.

In some implementations, in response to determining that that the user associated with the target device is out of range, the response and the displayed content associated with the target device are sent to the user associated with the target device. Whether the user associated with the target device is out of range can be determined based on the distance of the user to the target device or the at least one peripheral device, or a combination thereof. However, in response to determining that that the user associated with the target device is in range, the response can be played to the user, such as using a speaker of the at least one peripheral device or another device, such as a personal device of the user, to prompt the user to have a reaction to the displayed content associated with the task on the target device. For example, the at least one peripheral device can be pre-configured to control one or more target devices prior to the user obtaining the at least one peripheral device.

In some implementations, the at least one peripheral device further comprises an audio sensor, and at least one of the first input or the second input from the user associated with the target device is received by the audio sensor. The audio sensor can include a speaker and a microphone that allow the audio sensor to interact with the user verbally. In some implementations, generating, by the at least one processor, the response associated with the task to elicit from the user associated with the target device the reaction to the displayed content further comprises generating, by the at least one processor, an audio response associated with the task to elicit the reaction from the user associated with the target device in response to the displayed content, wherein the audio response is generated based on the displayed content associated with the task on the target device comprising the screenshot of the display screen of the target device. As discussed above, the audio response can be played on the speaker of the at least one peripheral device or the target device. The speaker of the at least one peripheral device can be part of or separate from the audio sensor of the at least one peripheral device.

Back to the living room movie playing example, in response to determining that the first instruction (e.g., opening a media player, searching and locating all titles with "Wild West") includes displaying content associated with the task on the TV, displayed content associated with the task on the target device can be obtained by the image sensor of the peripheral device, which includes a screenshot of the display screen of the TV. When the TV receives the first instruction (e.g., opening a media player or searching and locating all titles with "Wild West"), it may proceed to open a media player on the TV screen, search for all titles with "Wild West", and display the result, which may include one or more titles with "Wild West", on the TV screen. In case the image sensor of the peripheral device is not turned on or not facing the TV screen, additional instruction(s) can be determined by the peripheral device to turn on the image sensor and to make sure the image sensor faces the TV screen to get the best viewing angle of the TV screen. In some implementations, in response to detecting the displayed content on the TV screen that relates to "Wild West" and associated links, a screenshot of the TV screen can be obtained and analyzed to determine a response to elicit a reaction from Alex. The response can be generated by a machine learning model such as an LLM (e.g., the first LLM or the second LLM described above). If it is determined that Alex has stepped out of the room and thus out of the range and unable to view the displayed content on the TV screen, the screenshot can be sent to Alex along with the response. If Alex is within range, only the response needs to be played to him to elicit his reaction to the displayed content. For example, when two or more titles associated with "Wild West" appear in the search result, which can be analyzed by the machine learning model of the peripheral device based on the screenshot it obtained from the TV screen, the response can be a prompt question to the user such as, "do you want to watch the Wild West movie or Wild West documentary?" Alex responds with a reaction, for example, "I want to watch the Wild West movie."

In another example, such as when the first instruction is determined based on the first input as, for example, instructions for "move the cursor to coordinates associated with the icon of the browser," and "click on the icon," the icon of the browser can be recognized and the coordinates of the icon can be obtained from the screenshot by the image sensor of the displayed content on the display screen of the target device. This can help the target device with performing the instructions such as "move the cursor to coordinates associated with the icon of the browser."

At an operation 310, a second instruction for the target device to perform can be determined based on a second input received by the at least one peripheral device from the user associated with the target device. The second input is indicative of a reaction by the user to the displayed content associated with the task on the target device obtained at the operation 308.

In some implementations, the second instruction can include a supplemental set of instructions generated based on the second input indicative of the reaction by the user to the displayed content associated with the task on the target device, in addition to the first instruction determined from the first input. The second instruction can be regarded as further decomposed from the task based on user reactions, which can be used in iterations to refine the decomposition of the task into detailed and refined instructions, which allows for precise control of the target device by using the at least one peripheral device.

In some implementations, the second instruction for the target device to perform can be determined based on both the second input and the displayed content obtained by the image sensor at the operation 308, such as the screenshot discussed above.

Back to the living room movie playing example, the second input ("I want to watch the Wild West movie.") is received from Alex, which includes his reaction to the response "do you want to watch the Wild West movie or Wild West documentary" Based on the second input, the second instruction for the TV to perform can be determined as, for example, instructions including the coordinates of the link on the TV screen for the Wild West movie and moving the cursor to click on the link at the coordinates and starts playing the Wild West movie, etc. The second instruction can be then sent to the TV to perform, and the Wild West movie is played on the TV. During the whole time, Alex the user just sits on the sofa and has a conversation with the peripheral device, which is a very relaxing experience.

In some implementations, such as when the at least one peripheral device is connected to a communication network (e.g., the Internet), at least a part of the first input, the second input or the third input can be received from the communication network.

In some implementations, the image sensor can be programmed to periodically obtaining the displayed content associated with the task on the target device, such as every 1000 ms, and automatically removing duplicates, thus relieving the burden to instruct the image sensor to monitor and obtain the displayed content associated with the task on the target device. In that case, once it is determined that the first instruction includes displaying content associated with the task on the target device, the at least one processor of the at least one peripheral device can use the periodically obtained displayed contents from the image sensor and proceed to the operation 310.

Figure 4:
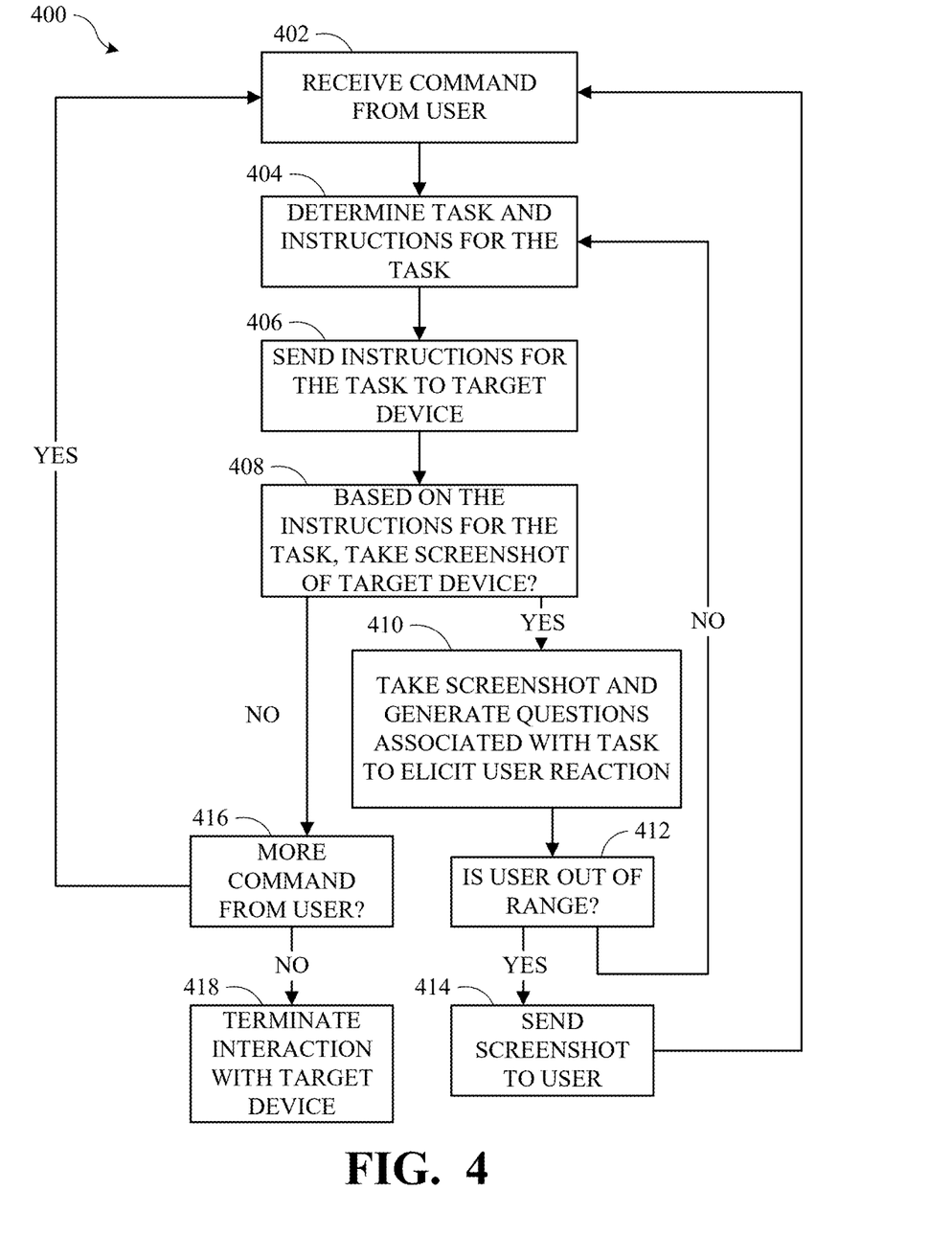
FIG. 4 is a flow diagram of an example process of using a peripheral device for operating a target device according to some implementations of this disclosure.

FIG. 4 illustrates an example process 400 of using at least one peripheral device for operating a target device according to some implementations of this disclosure. The process 400 can be similar to, or based upon, the process 300 of FIG. 3. Without repeating every detail already described in the process 300, the process 400 is described below with reference to the process 300 and the examples therein.

The process 400 can be implemented as software and/or hardware modules in, for example, the device 110 of FIG. 1 or the computing device 200 of FIG. 2. In an example, the process 400 can be implemented as software modules stored in the storage 230 as instructions and/or data executable by the processor 205 of an apparatus, such as the computing device 200 in FIG. 2. Some or all of the operations of the process 400 can be implemented by the processor 205 of FIG. 2. In another example, the process 400 can be implemented in hardware as a specialized chip storing instructions executable by the specialized chip. In some implementations, the process 400 can be implemented using more than one peripheral device, such as the device 110 or the computing device 200 (which can be used to implement a portion of the process 400) and another peripheral device (which can be used to implement the remaining portion of the process 400).

Without repeating every detail already described in the process 300, the at least one peripheral device that implements the process 400 includes an image sensor and at least one processor. The image sensor can include a camera with an adjustable viewing angle. In some implementations, the at least one peripheral device can also include an audio sensor. The audio sensor can include a speaker, or a microphone, or both. The at least one peripheral device can also be programmed to operate a remote speaker or microphone, such as one located at a personal device (e.g., mobile phone) of the user. The image sensor allows the at least one peripheral device to monitor and obtain displayed content on the display screen of the target device that relates to the performance of instructions sent by the peripheral device to the target device based on the user inputs. The displayed content can be analyzed to obtain further instructions from the user, thus creating a closed loop feedback control of the target device.

At an operation 402, a command is received from a user by the at least one peripheral device. The command can include a text, audio (e.g., voice) or visual (e.g., image or video) input.

At an operation 404, a task and instructions for the task (e.g., executable instructions for the target device to perform) can be determined by the at least one peripheral device based on the (user) command. The task and instructions for the task can be determined from the command using a machine learning model, which can be an LLM. In some implementations, the LLM can include at least one of a first large language model (LLM) customized for the user and adapted to run on the at least one peripheral device or a second LLM adapted to run on the server.

At an operation 406, the instructions for the task can be sent to the target device to perform. For example, the instructions for the task can be sent through the interface of the at least one peripheral device, such as through a wireless connection to the target device.

At an operation 408, the at least one peripheral device can determine, based on the instructions for the task, whether to take a screenshot of the target device. The screenshot of the target device is associated with the target device performing the instructions for the task.

If it is determined that the screenshot of the target device is needed, at an operation 410, the at least one peripheral device will take the screenshot and extract information from the screenshot, to generate question(s) associated with the task to elicit user reaction. If the user is out of range of the at least one peripheral device or the target device, the screenshot can be sent to the user, along with the questions associated with the task, to elicit user reaction. When the user is out of range and therefore unable to view the displayed content on the target device, the screenshot sent to the user can help the user with further command for the task. The user reaction in response to the questions associated with task can be received back at the operation 402 as a further command from the user by the at least one peripheral device, which will proceed accordingly.

If it is determined that the screenshot of the target device is not needed, at an operation 416, the at least one peripheral device can wait for more command from the user, and proceed to the operation 402 if more command is received from the user. However, if no further command is received from the user, the at least one peripheral device can terminate the interaction with the target device at an operation 418.

As another illustrative use case example, the process 400 can be implemented in an office scenario. A user, such as Alex in the previous example, is now at the office. The office is also equipped with a peripheral device for operating his work computer as the target device. The peripheral device includes a wireless camera placed opposite the display screen of the work computer. The peripheral device has access to a machine learning model adapted to run locally at the peripheral device or a server, which can help generate instructions for the work computer from user commands, obtain and analyze the displayed content on the work computer through the image sensor to elicit further commands from the user, and subsequently generate additional instructions for the work computer. After Alex stepped outside to get some morning coffee, an emergency pops up and he wants to send a design document that he has been working on to his product manager, Douglas. The design document is saved on his work computer. Alex speaks through his watch (or mobile phone) with the following command: "I need to email a design document to my manager Douglas. The document is saved under 'My Document' folder. Please send the screenshot of the folder for me to review first." The watch (or mobile phone) is connected to the peripheral device via a wireless connection interface. The peripheral device at the office receives the command from Alex's watch (or mobile phone), and determines the task and instructions associated with the task for the work computer to perform. Once the work computer performs the instruction associated with the task and the display screen of the work computer shows the "My Document" folder, the peripheral device takes a screenshot of the computer screen. Since Alex is out of range of the work computer or the peripheral device, the screenshot is sent to Alex. Soon, Alex receives the screenshot of "My Documents" folder on his work computer. A question associated with the task can also be generated to elicit Alex's reaction based on the screenshot, such as "which document do you want to send?" The document he would like to send is the fifth document in this folder. Alex once again speaks through his watch or mobile phone with another command: "please send the fifth document to Douglas Heung." Shortly after, Alex receives confirmation that the document has been sent and confirmed by Douglas.

Technical specialists skilled in the art should understand that the implementations in this disclosure may be implemented as methods, systems, or computer program products. Therefore, this disclosure may be implemented in forms of a complete hardware implementation, a complete software implementation, and a combination of software and hardware implementation. Further, this disclosure may be embodied as a form of one or more computer program products which are embodied as computer executable program codes in computer writable storage media (including but not limited to disk storage and optical storage).

This disclosure is described in accordance with the methods, devices (systems), and flowcharts and/or block diagrams of computer program products of the implementations, which should be comprehended as each flow and/or block of the flowcharts and/or block diagrams implemented by computer program instructions, and the combinations of flows and/or blocks in the flowcharts and/or block diagrams. The computer program instructions therein may be provided to generic computers, special-purpose computers, embedded computers or other processors of programmable data processing devices to produce a machine, wherein the instructions executed by the computers or the other processors of programmable data processing devices produce an apparatus for implementing the functions designated by one or more flows in the flowcharts and/or one or more blocks in the block diagrams.

The computer program instructions may be also stored in a computer readable storage which is able to boot a computer or other programmable data processing device to a specific work mode, wherein the instructions stored in the computer readable storage produce a manufactured product containing the instruction devices which implements the functions designated by one or more flows in the flowcharts and/or one or more blocks in the block diagrams.

The computer program instructions may also be loaded to a computer or another programmable data processing device to execute a series of operating procedures in the computer or the other programmable data processing device to produce a process implemented by the computer, whereby the computer program instructions executed in the computer or the other programmable data processing device provide the operating procedures for the functions designated by one or more flows in the flowcharts and/or one or more blocks in the block diagrams.

Apparently, the technical specialists skilled in the art may perform any variation and/or modification to this disclosure by the principles and within the scope of this disclosure. Therefore, if the variations and modifications herein are within the scope of the claims and other equivalent techniques herein, this disclosure intends to include the variations and modifications thereof.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising", and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. The terms "at least one of A or B," "at least one of A and B," "one or more of A or B," "A and/or B" used herein mean "A", or "B" or "A and B".

While the disclosure has been described in connection with certain embodiments or implementations, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of using at least one peripheral device for operating a target device, the at least one peripheral device comprising an image sensor and at least one processor, and the method comprising:
   receiving, by the at least one peripheral device, a first input from a user associated with the target device, the first input indicative of a task to be performed by the target device;
   determining, by the at least one processor, a first instruction for the target device to perform based on the first input;
   determining, by the at least one processor, whether the first instruction includes displaying content associated with the task on the target device;
   in response to determining that the first instruction includes displaying content associated with the task on the target device, obtaining, by the image sensor, displayed content associated with the task on the target device comprising a screenshot of a display screen of the target device; and
   determining, by the at least one processor, a second instruction for the target device to perform based on a second input received by the at least one peripheral device from the user associated with the target device, the second input indicative of a reaction to the displayed content associated with the task on the target device.

2. The method of claim 1, wherein determining, by the at least one processor, whether the first instruction includes displaying content associated with the task on the target device comprises:
   determining whether displaying content associated with the task on the target device is required by the task; and
   in response to determining that displaying content associated with the task on the target device is required by the task, detecting the displayed content on the display screen of the target device that relates to the first instruction.

3. The method of claim 2, wherein in response to determining that the first instruction includes displaying content associated with the task on the target device, obtaining, by the image sensor, the displayed content associated with the task on the target device comprising the screenshot of the display screen of the target device comprises:
   in response to detecting the displayed content on the display screen of the target device that relates to the first instruction, obtaining, by the image sensor, the screenshot of the display screen of the target device that relates to the first instruction and is associated with the task.

4. The method of claim 1, further comprising:
   in response to obtaining the displayed content associated with the task on the target device and determining that the user associated with the target device is out of range, sending, by the at least one peripheral device to the user associated with the target device, the displayed content comprising the screenshot of the display screen of the target device.

5. The method of claim 1, further comprising:
   generating, by the at least one processor, a response associated with the task to elicit from the user associated with the target device the reaction to the displayed content, wherein the response is generated based on the displayed content associated with the task on the target device.

6. The method of claim 5, wherein at least one of the first instruction for the target device to perform based on the first input or the response associated with the task is determined by the at least one processor using a machine learning model adapted to run on the at least one processor or a server.

7. The method of claim 6, wherein the machine learning model adapted to run on the at least one processor or the server comprises at least one of a first large language model (LLM) customized for the user and adapted to run on the at least one peripheral device or a second LLM adapted to run on the server.

8. The method of claim 7, wherein:
   the machine learning model adapted to run on the at least one processor or the server comprises the first LLM and the second LLM;
   the at least one of the first instruction for the target device to perform based on the first input or the response associated with the task is determined by the at least one processor using the first LLM based on a determination that a connection between the server and the at least one peripheral device is not established; and
   the at least one of the first instruction for the target device to perform based on the first input or the response associated with the task is determined by the at least one processor using the second LLM based on a determination that a connection between the server and the at least one peripheral device is established.

9. The method of claim 5, further comprising:
   in response to determining that that the user associated with the target device is out of range, sending the response and the displayed content associated with the target device to the user associated with the target device.

10. The method of claim 9, further comprising:
    determining, by the at least one processor, whether the user associated with the target device is out of range of at least one of the target device or the at least one peripheral device.

11. The method of claim 5, further comprising:
    in response to determining that that the user associated with the target device is in range, playing the response to prompt the user associated with the target device.

12. The method of claim 5, wherein the at least one peripheral device further comprises an audio sensor, and at least one of the first input or the second input from the user associated with the target device is received by the audio sensor.

13. The method of claim 12, wherein generating, by the at least one processor, the response associated with the task to elicit from the user associated with the target device the reaction to the displayed content further comprises:
generating, by the at least one processor, an audio response associated with the task to elicit the reaction from the user associated with the target device in response to the displayed content, wherein the audio response is generated based on the displayed content associated with the task on the target device comprising the screenshot of the display screen of the target device.

14. The method of claim 1, further comprising:
in response to determining that the first instruction includes displaying content associated with the task on the target device, prior to obtaining, by the image sensor, the displayed content associated with the task on the target device:
determining, by the at least one processor, a third instruction to turn on the image sensor to face the display screen of the target device.

15. The method of claim 1, wherein the image sensor comprises a camera with an adjustable viewing angle for capturing the display screen of the target device.

16. The method of claim 1, wherein determining, by the at least one processor, whether the first instruction includes displaying content associated with the task on the target device further comprises:
determining, by the at least one processor, whether the display screen of the target device has been turned on; and
in response to determining that the display screen of the target device has been turned on, monitoring the display screen of the target device for detecting the displayed content on the display screen of the target device that relates to the first instruction.

17. The method of claim 1, further comprising:
in response to determining that the first instruction does not include displaying content associated with the task on the target device, determining the second instruction for the target device to perform based on a third input received by the at least one peripheral device from the user associated with the target device, the third input indicative of a reaction to the first instruction performed by the target device.

18. A non-transitory computer-readable storage medium configured to store computer programs for using at least one peripheral device for operating a target device, the computer programs comprising instructions executable by at least one processor to perform the method of claim 1.

19. A peripheral device for operating a target device, comprising:
an image sensor;
a non-transitory memory; and
at least one processor configured to execute instructions stored in the non-transitory memory to:
receive a first input from a user associated with the target device, the first input indicative of a task to be performed by the target device;
determine a first instruction for the target device to perform based on the first input;
determine whether the first instruction includes displaying content associated with the task on the target device;
in response to determining that the first instruction includes displaying content associated with the task on the target device, instruct the image sensor to obtain displayed content associated with the task on the target device comprising a screenshot of a display screen of the target device; and
determine second instruction for the target device to perform based on a second input received by the peripheral device from the user associated with the target device, the second input indicative of a reaction to the displayed content associated with the task on the target device.

20. The peripheral device of claim 19, wherein the image sensor comprises a camera with an adjustable viewing angle for capturing the display screen of the target device, and the instructions to determine whether the first instruction includes displaying content associated with the task on the target device further comprise instructions to:
determine whether displaying content associated with the task on the target device is required by the task; and
in response to determining that displaying content associated with the task on the target device is required by the task, detect the displayed content on the display screen of the target device that relates to the first instruction, and
the instructions further comprise instructions to:
in response to determining that the first instruction includes displaying content associated with the task on the target device and prior to obtaining, by the image sensor, the displayed content associated with the task on the target device, determine a third instruction to turn on the image sensor to face the display screen of the target device.

\* \* \* \* \*